Patented Jan. 27, 1942

2,271,368

UNITED STATES PATENT OFFICE 2,271,368

CAST REFRACTORY

Gordon S. Fulcher, Chevy Chase, Md., and Theodore E. Field, Louisville, Ky., assignors to Corhart Refractories Company, Louisville, Ky., a corporation of Delaware No Drawing. Application October 24, 1939, Serial No. 301,080

13 Claims. (Cl. 106—57)

It is the object of this invention to provide cast refractories which are remarkably resistant to chemical corrosion by alkaline fluxes even at high temperatures and therefore suitable for use in contact with molten glass, as for example in feeder parts.

$Cr_2O_3$ (chromic oxide) is known to be refractory both to heat and fluxes, which suggests its use in contact with glass. Because of the strong coloring action of $Cr_2O_3$ dissolved in clear glasses however, it is essential that any refractories containing $Cr_2O_3$ be superlatively resistant in contact with glass in order that the dissolved material be highly diluted in the body of the glass. One way to increase resistance of a given refractory composition is to melt and cast it as disclosed in U. S. Patent #1,615,750 to Fulcher so that the porosity is eliminated and the necessity of any less resistant and fluxing bonds is dispensed with.

Green chromic oxide when cast without additions in this way is found to be extremely resistant.

Because of the high melting point of chromic oxide and the increased tendency of the electrodes to reduce the oxide at elevated temperatures, it is however very difficult to make melts with chromic oxide alone. British Patent #448,942 discloses a cast refractory consisting of a mixture of alumina and at least 10% $Cr_2O_3$. While as little as 30% $Al_2O_3$ materially improves the casting properties of $Cr_2O_3$, unfortunately the resistance is progressively lowered by additions of even pure alumina and the coloring action on glass increased.

We have discovered, however, that when $ZrO_2$ is added to $Cr_2O_3$ a more readily fused mixture is obtained in spite of the fact that the melting point is not appreciably lowered or may even be raised with high percentages of $ZrO_2$. This benefit is apparently associated with the dilution of the readily reduced metallic oxide by the difcultly reduced $ZrO_2$. Tests with $Cr_2O_3$-$ZrO_2$ compositions have shown that resistance is scarcely altered as $ZrO_2$ is substituted for $Cr_2O_3$ and therefore coloring action is not increased. In fact it is decreased to the extent that the $ZrO_2$ dissolved replaces $Cr_2O_3$ with this weakly colored oxide.

While the addition of $Al_2O_3$ to $Cr_2O_3$ gives a solid solution of $Al_2O_3$ in $Cr_2O_3$ which is apparently responsible for the decrease in resistance, when $ZrO_2$ is added to $Cr_2O_3$, the $Cr_2O_3$ retains its identity and the $ZrO_2$ crystallizes separately as baddeleyite. The mixture of these two very resistant crystal phases is responsible for the superlative resistance obtained.

For the raw materials one may use green chrome oxide and electrically fused zirconia without other additions. Green chrome oxide is produced commercially in large quantities as a paint pigment and this material is quite suitable for our refractories. Since purity of color is not an objective in our raw materials, off shades of chromic oxide unsuitable for paint pigment without reworking can also be used at a cheaper cost. Electrically fused zirconia is available commercially produced from zircon by removal of silica. As batches which give excellent resistance we might cite the following:

| Batch | $Cr_2O_3$ | Fused $ZrO_2$ |
|---|---|---|
| #1 | 80 | 20 |
| #2 | 40 | 60 |

Since fused zirconia is currently more expensive than green chrome oxide, for purposes of economy, the high $Cr_2O_3$ would be preferred. If on the other hand greater freedom from coloring action is required, higher zirconia is preferred.

The desirable results obtained by adding zirconia to the chromic oxide melt extend to cases in which the melt contains not only zirconia and chromic oxide but also contains limited quantities of alumina and silica. In such cases the silica is segregated in a glassy matrix; the alumina may be found in the glassy matrix as well as in the crystalline phase of the casting, or in both, dependent on the quantity used.

When $Al_2O_3$ and $ZrO_2$ are added to $Cr_2O_3$ rather than $ZrO_2$ alone, the crystalline phases produced are baddeleyite and a solid solution of alumina in $Cr_2O_3$. While the latter phase is less resistant than $Cr_2O_3$ itself the presence of the $ZrO_2$ dilutes the coloring action so that less $Cr_2O_3$ is dissolved into the glass than when $ZrO_2$ is not present. It is thus possible to cheapen the batch by adding alumina without getting excessive coloring action. As a useful batch we might cite the following:

No. 1

| $Cr_2O_3$ | $ZrO_2$ | $Al_2O_3$ |
|---|---|---|
| 40 | 30 | 30 |

Relatively good results with a cheaper batch can also be obtained by combining chromic oxide with a crude zirconium oxide produced commercially with about 5% silica. This crude oxide results from the reduction and volatilization of most of the silica from purified zircon when the latter is melted with coke in an electric furnace. Since zircon is relatively cheap, this material can be and is produced commercially at prices lower than either chromic oxide or fused zirconia. The latter is in fact manufactured from the crude oxide by the further process of remelting it without coke whereby the remaining silica is volatilized by the high temperature obtained and a pig of pure zirconia produced.

When this crude oxide is melted with chromic oxide, the same crystal phases are produced as with pure zirconia. The silica however forms a glass phase with some of the zirconia and chromic oxide. This glass phase is less resistant than the crystal phases and accounts for the diminution of resistance. Nevertheless the dilution of the coloring chromic oxide in the refractory apparently offsets the increase in amount of solution so that no appreciable increase in coloring action occurs because of its inclusion.

As suitable batches we may cite the following:

No. 1

| Batch | Batch analysis | | |
|---|---|---|---|
| | $Cr_2O_3$ | $ZrO_2$ | $SiO_2$ |
| 40 $Cr_2O_3$ | 40 | | |
| 60 crude $ZrO_2$ | | 57.3 | 2.7 |
| | 40 | 57.3 | 2.7 |

No. 2

| Batch | Batch analysis | | |
|---|---|---|---|
| | $Cr_2O_3$ | $ZrO_2$ | $SiO_2$ |
| 60 $Cr_2O_3$ | 60 | | |
| 40 crude $ZrO_2$ | | 38 | 2 |
| | 60 | 38 | 2 |

We have also discovered that the addition of as little as 10% $Al_2O_3$ improves the resistance of $Cr_2O_3$-$ZrO_2$ compositions containing silica. The first few percent of course go into the glass phase until it is saturated. The addition of $Al_2O_3$ to such a glass phase would be expected to raise the softening point and increase the viscosity and presumably this is responsible for the improvement in resistance to fluxes.

Further additions of $Al_2O_3$ produce a solid solution of $Al_2O_3$ in $Cr_2O_3$ which is less resistant as a phase than pure $Cr_2O_3$. However, substitution of $Al_2O_3$ cheapens the batch also and in view of the fact that part of the $Cr_2O_3$ is already substituted by crude zirconium oxide, $Al_2O_3$ can be added and the resistance decreased without dissolving as much coloring $Cr_2O_3$ into the glass as would be obtained in the absence of the zirconia. As batches which have given good results we may cite the following:

No. 1

| Batch | Batch composition | | | |
|---|---|---|---|---|
| | $Cr_2O_3$ | $ZrO_2$ | $SiO_2$ | $Al_2O_3$ |
| 40 $Cr_2O_3$ | 40 | | | |
| 50 crude $ZrO_2$ | | 47 | 3 | |
| 10 $Al_2O_3$ | | | | 10 |
| | 40 | 47 | 3 | 10 |

No. 2

| Batch | Batch analysis | | | |
|---|---|---|---|---|
| | $Cr_2O_3$ | $ZrO_2$ | $SiO_2$ | $Al_2O_3$ |
| 40 $Cr_2O_3$ | 40 | | | |
| 30 crude $ZrO_2$ | | 28 | 2 | |
| 30 $Al_2O_3$ | | | | 30 |
| | 40 | 28 | 2 | 30 |

Bayer process alumina or other relatively pure grades can be used. The use of bauxite is not recommended because the increase in silica which results, produces more of the poorly resistant glass phase. It is obvious that chemical composition is the important thing and any materials which will give an equivalent batch analysis can be used. In particular it might be noted that fair results may be obtained using the natural $ZrO_2$ ore sold as zirkite. This ore is obtainable in a wide variety of analyses the impurities being $Al_2O_3$, $SiO_2$, $Fe_2O_3$ and $TiO_2$. For the above purposes $Al_2O_3$ is not objectionable and the titania is normally low. By further carefully selecting ore low in silica and iron oxide, a material can be obtained suitable for the above purposes. The cost is less than for the manufactured crude oxide but the resistance obtained is also decreased by the additional impurities so that the economies of its use depend on what is required of the particular refractory.

In the following claims we use the term "heat cast" to identify a refractory which forms from the solidification of molten material, thereby distinguishing it from a wet cast product.

What we claim is:

1. A heat cast refractory containing substantial quantities of crystalline chromic oxide greatly in excess of one percent and zirconia.

2. A heat cast refractory, the crystalline phases of which are chromic oxide and zirconia, the chromic oxide constituting at least 15% of the refractory.

3. A heat cast refractory containing substantial quantities of crystalline chromic oxide greatly in excess of one percent, zirconia and alumina.

4. A heat cast refractory the crystalline phases of which are chromic oxide, zirconia and alumina, the chromic oxide constituting at least 15% of the refractory.

5. A heat cast refractory analytically containing over 15% chromic oxide the remainder being substantially zirconia.

6. A heat cast refractory the crystalline phases of which consist of zirconia and chromic oxide, with alumina in solid solution, the chromic oxide constituting at least 15% of the refractory.

7. A heat cast refractory containing over 15% of chromic oxide and over 20% zirconia by chemical analysis, the remainder being substantially alumina.

8. A heat cast refractory consisting essentially of crystalline chromic oxide, crystalline zirconia and a siliceous glass, the chromic oxide constituting at least 15% of the refractory.

9. A heat cast refractory containing over 15% of chromic oxide and less than 5% silica by chemical analysis, the remainder being substantially zirconia.

10. A heat cast refractory consisting essentially of crystalline zirconia, crystalline chromic oxide, and a siliceous glass which further contains alumina in solution, the chromic oxide constituting at least 15% of the refractory.

11. A heat cast refractory containing over 15% of chromic oxide, less than 5% of silica and less than 10% of alumina by chemical analysis, the remainder being substantially zirconia.

12. A heat cast refractory consisting essentially of crystalline zirconia, crystalline chromic oxide, alumina in solid solution in chromic oxide, and a siliceous glass, the chromic oxide constituting at least 15% of the refractory.

13. A heat cast refractory containing over 15% of chromic oxide, over 20% of zirconia and less than 5% silica by chemical analysis, the remainder being substantially alumina.

GORDON S. FULCHER.
THEODORE E. FIELD.